US005628565A

United States Patent [19]
Hagen et al.

[11] Patent Number: 5,628,565
[45] Date of Patent: May 13, 1997

[54] MULTIFUNCTIONAL AIR DATA SENSING PROBES

[75] Inventors: Floyd W. Hagen, Eden Prairie; Gregg A. Hohenstein, Bloomington; John A. Severson, Eagan; Pennelle J. Trongard, Savage, all of Minn.

[73] Assignee: The B.F. Goodrich Company, Akron, Ohio

[21] Appl. No.: 460,103

[22] Filed: Jun. 2, 1995

Related U.S. Application Data

[62] Division of Ser. No. 122,222, Sep. 17, 1993, Pat. No. 5,466,067.

[51] Int. Cl.$^6$ .......................... G01K 13/02; G01K 1/14; G01C 21/00; G01P 5/165
[52] U.S. Cl. .......................... 374/143; 374/148; 374/138; 73/182; 73/861.65; 73/861.66
[58] Field of Search .......................... 374/143, 135, 374/148, 138; 73/180, 182, 861.66, 861.68, 861.65

[56] References Cited

U.S. PATENT DOCUMENTS

| | | | |
|---|---|---|---|
| 2,588,840 | 3/1952 | Howland | 374/138 |
| 2,931,227 | 4/1960 | Werner et al. | |
| 2,942,472 | 6/1960 | Harney | 374/138 |
| 2,970,475 | 2/1961 | Werner | 374/135 |
| 3,000,213 | 9/1961 | Eves et al. | 374/138 |
| 3,170,328 | 2/1965 | Werner et al. | |
| 3,512,414 | 5/1970 | Rees | |
| 3,623,367 | 11/1971 | Benedict | 374/135 |
| 3,940,988 | 3/1976 | Reed | 374/148 |
| 4,152,938 | 5/1979 | Danninger | 374/148 |
| 4,222,277 | 9/1980 | Kurtz et al. | 73/721 |

(List continued on next page.)

FOREIGN PATENT DOCUMENTS

| | | | |
|---|---|---|---|
| 1046627 | 10/1983 | U.S.S.R. | 374/138 |
| 0616009 | 1/1949 | United Kingdom | 374/148 |

OTHER PUBLICATIONS

Redacted drawing for 154CF4 –Rosemount Sensor (1981).
Redacted sectional view for 154CF4 –Rosemount Sensor (1981).
Product Data Sheet 2608 of Rosemount Inc., 1987, 1990, "Rosemount Model 92BH or 92BJ Air Data Flight Test Boom".
Technical Report 5755, Revision A, 1981 of Rosemount Inc. "Rosemount Total Temperature Sensors".
Rosemount Report D8720047, Feb. 1987, "Accuracies for Digital Multiple Output Air Data Systems for Angle of Attack, Pitot and Static Pressure Measurements", by Floyd W. Hagen and Richard V. DeLeo.
Copy of photographic display and redacted drawing of Rosemount Part Number 129L (no date).
Copy of Rosemount Aerospace catalog cover and back pages, and pages entitled "Test and Measurement", Space Program and Turbine Engines (1984).
Rosemount Total Temperature Sensors Bulletin 1012, revised Jan., 1989.

*Primary Examiner*—Diego F. F. Gutierrez
*Attorney, Agent, or Firm*—Westman, Champlin & Kelly, P.A.

[57] ABSTRACT

An aerodynamic air data sensing probe adapted for mounting to an air vehicle and capable of generating signals related to a fluid flowing relative to the air vehicle. A fluid inlet positioned on a first end of the strut faces generally transverse to the fluid flow selectively admits fluid to an internal strut cavity due to a pressure differential thereacross. In operation, the pressure differential forms between the first end surface of the aerodynamically-shaped, forward-inclined strut and probe exhaust ports. A temperature sensing element disposed in the internal strut cavity registers the temperature of the fluid and the sensed fluid is expelled from the internal strut cavity through the exhaust ports. In another embodiment, a barrel-shaped probe head adapted to sense fluid pressure connects to a portion of the leading edge of the strut to form an aerodynamic multifunction air data sensing probe.

4 Claims, 5 Drawing Sheets

U.S. PATENT DOCUMENTS

| | | | |
|---|---|---|---|
| 4,322,980 | 4/1982 | Suzuki et al. | 73/727 |
| 4,378,696 | 4/1983 | DeLeo et al. | 73/180 |
| 4,378,697 | 4/1983 | DeLeo et al. | 73/182 |
| 4,403,872 | 9/1983 | DeLeo | 374/138 |
| 4,615,213 | 10/1986 | Hagan | 73/180 |
| 4,645,517 | 2/1987 | Hagen et al. | 73/182 |
| 4,672,846 | 6/1987 | LeBlond et al. | 73/180 |
| 4,677,858 | 6/1987 | Ohnhaus | 73/861.65 |
| 4,718,273 | 1/1988 | McCormack | 73/180 |
| 4,730,487 | 3/1988 | DeLeo et al. | 73/182 |
| 4,765,751 | 8/1988 | Pannone et al. | 374/135 |
| 4,790,192 | 12/1988 | Knecht et al. | 73/721 |
| 4,836,019 | 6/1989 | Hagen et al. | 73/180 |
| 5,018,873 | 5/1991 | Bobo | 374/144 |
| 5,025,661 | 6/1991 | McCormack | 73/180 |
| 5,076,103 | 12/1991 | Lagen et al. | 73/182 |
| 5,302,026 | 4/1994 | Phillips | 374/135 |
| 5,319,970 | 6/1994 | Peterson et al. | 73/182 |
| 5,331,849 | 7/1994 | Hedberg et al. | 73/182 |

MULTIFUNCTIONAL AIR DATA SENSING PROBES

This is a divisional of application Ser. No. 08/122,222, filed Sep. 17, 1993, now U.S. Pat. No. 5,466,067.

BACKGROUND OF THE INVENTION

The present invention relates to air data sensing probes. In particular, the present invention includes embodiments of an improved air data probe capable of operating solely as a total temperature sensor or in combination with pressure sensing probes as a multifunctional air data sensor.

Reducing weight and aerodynamic drag continues as a primary design goal for external components mounted on air vehicles. However, air data probes for sensing and measuring properties of a fluid medium near an air vehicle preferably protrude from the air vehicle to detect relatively undisturbed air flow to accurately measure air data parameters. For redundancy and safety, duplicate protruding probes are used for flight-critical information to ensure that back-up systems are available in case of failure of one system. Unfortunately, each such probe increases aerodynamic drag, weight, complex electrical and, often, pneumatic, coupling as well as observability.

The aerodynamic drag generated by probes that protrude into the fluid stream rapidly increases as an air vehicle accelerates from subsonic to near-sonic velocities. In fact, as velocity of an air vehicle rises to near-sonic velocity, the aerodynamic drag of known probes begins a pronounced, and undesired, upward trend. When multiplied due to presence of back-up air data sensing equipment, this component of aerodynamic drag adversely affects air vehicle performance. Thus, combining sensor capabilities into a single aerodynamic shape greatly reduces total drag on the air vehicle. Additionally, further refinement of protruding air data sensing probes into compact, low-mass air data probes yields savings of electrical power to deice and anti-ice the probe. Thus, aerodynamically efficient, multiparameter air data sensing probes that eliminate weight, reduce aerodynamic drag, observability and provide relatively simultaneous single-point measurements solves several long-standing impediments to efficiently measuring flight-critical air data parameters. Therefore, a need in the art exists for aerodynamically-shaped, efficient, multiparameter air data sensing probes.

U.S. Pat. No. 2,970,475 issued to Frank D. Werner teaches fundamental concepts regarding air data probes. U.S. Pat. No. 2,970,475 is hereby incorporated by reference.

SUMMARY OF THE INVENTION

In the present invention, an air data sensing probe mountable to an air vehicle incorporates desired features to provide efficient air data sensing. In operation, the present probes selectively separate portions of the fluid stream before receiving a flow of substantially unheated (at ambient temperature) debris-free fluid through an uncovered inlet facing away from the mounting surface transverse to the fluid stream. In a first embodiment, the probe senses total temperature. In other embodiments, a probe head member for sensing pitot and/or pitot-static pressure or for measuring flow angle mounts to the strut to sense flight-critical air data.

In the first embodiment of the invention, an air data sensing probe generates signals related to temperature of a fluid medium through which the air vehicle travels. In this embodiment, an aerodynamically-shaped housing mender or strut attaches to an air vehicle at a first end and has a cavity which houses a temperature sensing element that accurately measures the adiabatic temperature of the fluid. An inlet aperture leading to the cavity is exposed to the flow past the strut and faces generally away from the mounting surface and transverse to the fluid stream at a second end of the strut. A flow turning plate, preferably located on the second end of the strut and upstream from the inlet aperture can deflect entrained particles from the inlet aperture and has fluid boundary layer bleed holes leading from the plate surface to an area of reduced pressure to substantially eliminate boundary layer fluid upstream and aligned with the inlet. Thus there is a reduction in boundary layer fluid entering the inlet to the cavity. The boundary layer fluid on the turning plate surface is induced to separate from free stream fluid due to the distributed withdrawal of boundary layer fluid through the bleed holes, and an unheated core sample of fluid enters an internal cavity of the probe where it contacts a suitable temperature sensor.

In further embodiments aerodynamically-shaped probes are used in connection with temperature sensors disposed in strut cavities having boundary layer control apertures upstream of the sensor. In one form a probe barrel mounts to a leading edge portion of the strut near the second end of a strut which is constructed as in the first embodiment. For example, a conventional barrel-shaped probe head adapted to sense fluid pressure is mounted on the strut and the combination serves as a multifunctional (pressure and temperature) air data probe. Probes of the present invention can utilize many aerodynamic probe heads for sensing air data parameters, such as any of the family of aerodynamically compensated pressure tubes disclosed and claimed in U.S. Pat. No. 4,730,487 to DeLeo et al., hereby incorporated by reference. Flight-critical air data parameters are detected by ports which sense pitot and pitot-static parameters, and configured to sense angle-of-attack (AOA) and angle of sideslip, as disclosed and claimed in U.S. Pat. No. 4,836,019 to Hagen et al. and U.S. Pat. No. 4,615,213 to Hagen, both of which are hereby incorporated by reference. Furthermore, when configured as a complete probe transducer unit (PTU), a compact self-contained sensor/transducer assembly located proximate the probe mounting surface, further advantages obtain. The PTU arrangement gives very fast response without noticeable pressure lag and PTUs avoid the dither, overshoot and damping of mechanical AOA vanes when adapted to sense pitot or static pressure. Also, air data sensing transducers disposed internally within the probe housing adapt for use in cooperation with the present invention. For example, the present air data probes can utilize internally-mounted or close-coupled transducers, each of which reduces electrical wiring and pneumatic ducting and allows complete field-replacement of a defective unit, following individual aerodynamic inspection and pressure testing at a convenient location remote from the air vehicle.

DESCRIPTION OF THE PREFERRED EMBODIMENTS

Figure 1:
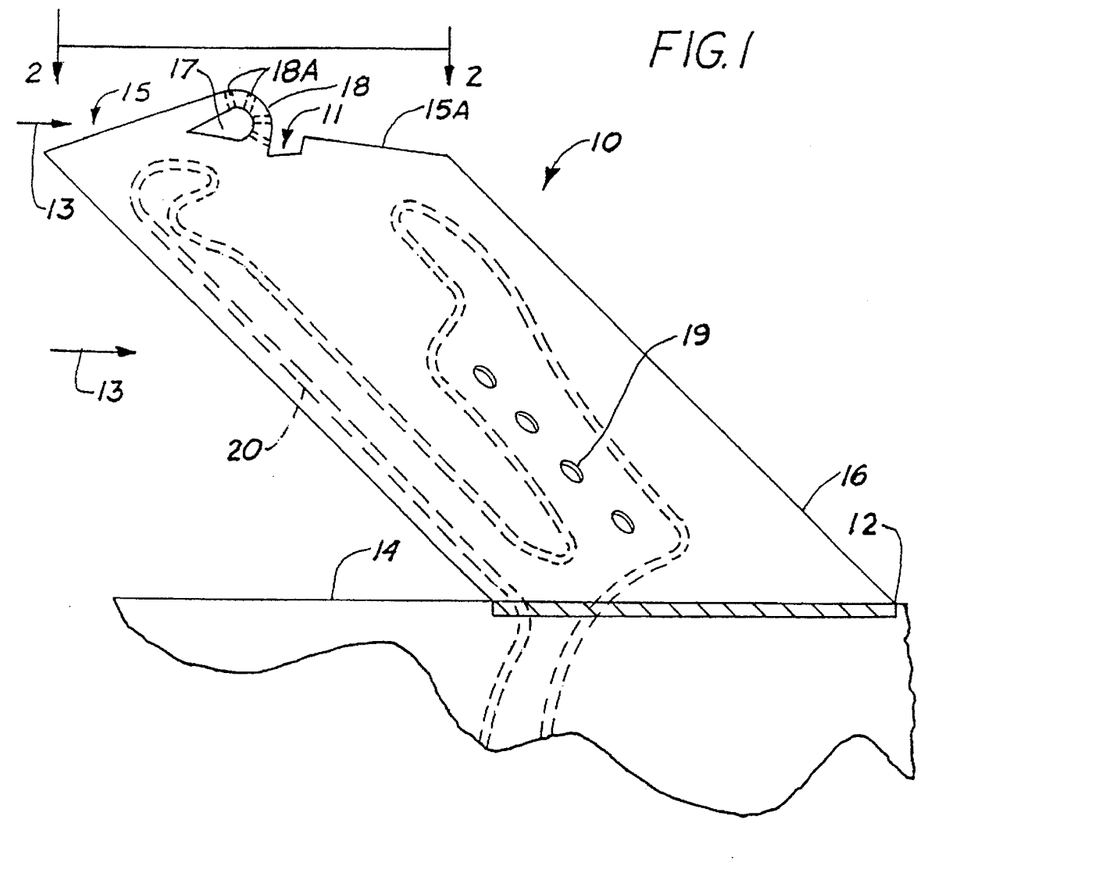
FIG. 1 is an elevational side view of a first embodiment of the air data probe of the present invention.

In FIG. 1, air data probe 10 extends from a base member 12 connected to a mounting surface 14, typically the surface of an air vehicle, to position the probe 10. An aerodynamically-shaped strut member 16 fixed to the base member 12 at a proximal end supports the probe 10 in position extended into a fluid stream, denoted by arrow 13. The strut member 16 preferably forms an acute angle with the mounting surface 14 of approximately 45 degrees. A distal end surface 15 of the probe 10 oriented substantially transverse to the fluid flow 13 so that the surface 15 lies generally along the direction of flow of the fluid stream 13 but may taper away from the surface 14 in downstream direction. A fluid inlet aperture 11 extends across surface 15 and faces generally away from mounting surface 14 and transverse to the fluid flow 13, that is, the fluid flows across the inlet aperture 11. A perforated portion of surface 15, denoted 18A, and located upstream from the inlet 11 provides distributed withdrawal of boundary layer fluid thereacross. The perforations through the surface 18A bleed off boundary layer fluid prior to fluid flow entering the inlet 11.

The surface 18A may be formed to be tapered up from the surface 15 and is made as a turning plate 18, having an interior cross passageway or space 17 extending therethrough laterally of the direction of the fluid flow, to discharge to the atmosphere, or the interior of the passageway 17 may be vented to the interior of probe 10 through optional ports 17A. If ports 17A are used the side openings of passageway 17 may be closed to the atmosphere. The turning plate 18 joins the end surface 15 of probe 10 upstream from inlet aperture 11 and deflects the fluid stream 13. The backward step configuration at inlet 11, as well as the shape of the strut shown in FIG. 2, contribute to a zone of increased pressure at aperture 11.

A first pressure differential forms between the end surface 15 and the lateral sides of the strut 16. The turning plate 18 deflects large entrained particles and air-borne debris, including water droplets, away from the inlet aperture 11 of the probe 10 which opens at a level offset more closely to the surface 15 than the outer end of turning plate 18. The passageway 17 preferably opens laterally to an area of reduced pressure along the sides of strut 16 near the maximum width dimension. A ramp surface portion 15A downstream of the distal end surface 15 and downstream from inlet 11, tapers or slants toward the surface 14 to avoid accumulation of water drops and other debris on the ramp surface portion 15A. The tapered rear side of strut 16 comprises a second ramp surface downstream from inlet 11.

Thus, only a substantially unheated, particle-free portion of the fluid stream reaches inlet 11 and enters the interior of the probe 10. A portion of the fluid 13 passing across the inlet 11 enters a primary cavity 21 of the strut 16 and impinges upon a temperature sensing element 25 which is suitably isolated therein by one or more radiation and thermal boundary layer shields, as shown at 40 in FIG. 3. The temperature sensing element 25 measures the adiabatic temperature of the fluid in an interior stagnation zone within the primary cavity 21 where the fluid stagnates briefly prior to venting of the fluid through a plurality of ports 26 fluidly coupling primary cavity 21 with a secondary cavity 27, which in turn fluidly couples to exhaust ports 19. The ports 19 can be designed to have an opening area sized in the aggregate in relation to the opening area defined by inlet aperture 11, to control the amount of fluid flowing through the probe. Thus, the relative size of the opening of the inlet aperture 11 and the exhaust ports 19 may be adjusted to gain suitable fluid flow for a given type of heating element, the desired amount of internal fluid flow, and anticipated flight conditions.

The fluid exhaust ports 19 are located on an area of the surface of the probe 10 characterized by a reduced static pressure compared to the zone of increased fluid pressure present near end surface 15, and particularly, near the inlet aperture 11. In this way, the fluid flows from the inlet aperture 11 through the interior of primary cavity 21 into secondary cavity 27 prior to being expelled from the probe through the fluid exhaust ports 19. The preferred location for exhaust ports 19 lies near a central line defining a maximum lateral dimension of the probe 10 where static pressure is reduced to a relative minimum.

Suitable heating elements 20, internally brazed into the strut 16 or externally brazed into grooves on the outside of strut 16, provide a deicing capability necessary for accurate operation of probe 10 under all-weather conditions. The reduced thermal mass of the present probe in relation to known probes using an inlet scoop member and the fact that the probe internally receives relatively few entrained particles in comparison to known total temperature air data probes, all contribute to produce a rapid and efficient deicing capability. This remains true even though the preferred 45 degree mounting angle of the strut leading edge adds surface area compared to similar probes mounted perpendicular to the mounting surface. However, a deicing capability is not necessary to the successful practice of the present invention.

Figure 2:
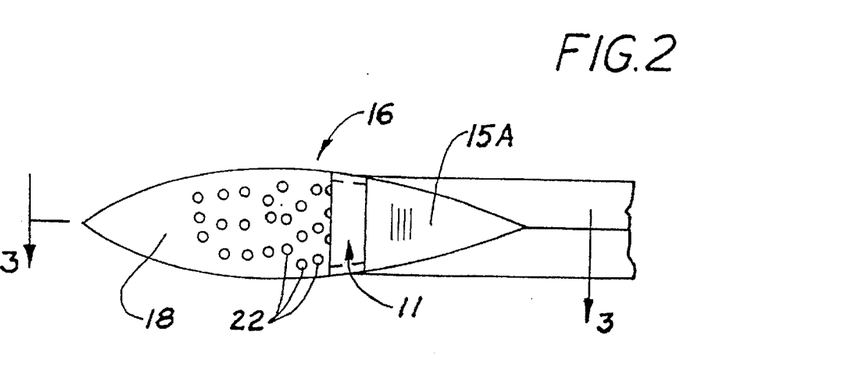
FIG. 2 is a plan view of the first embodiment of the present invention taken along lines 2—2 of FIG. 1.

Referring to FIG. 2, the turning plate 18 and surface 18A also remove heated boundary layer fluid from the fluid stream 13 so that heated boundary layer fluid does not enter the interior of the cavity 21. During fluid flow a second pressure differential forms between the zone of increased pressure over the end surface 15, and particularly over the upstream portion of turning plate 18 in relation to reduced pressure present in the passageway 17 so that boundary layer fluid is forced through a plurality of small apertures 22 formed through a wall of turning plate 18 and vented into passageway 17 prior to evacuation to the atmosphere. Thus, boundary layer fluid traverses the turning plate 18, flows through the apertures 22 into the passageway 17, which preferably opens laterally to an area of reduced fluid pressure. Consequently, in operation, boundary layer fluid flows out of the passageway 17 as a result of the second pressure differential and continuously vents to the atmosphere outside the probe 10, allowing only substantially free stream fluid to reach the inlet 11. Alternately, the turning plate 18 may couple to the interior of probe 10 through openings 17Aso that boundary layer fluid passing through apertures 22 is discharged into the strut cavity.

Also, in FIG. 2, the turning plate 18 preferably extends across the entire lateral dimension of surface 15 upstream of the inlet aperture 11. The plurality of boundary layer bleed holes 22 disposed on turning plate 18 are located to provide distributed withdrawal of boundary layer fluid from the fluid flowing over turning plate 18. The boundary layer bleed holes 22 provide a path for the boundary layer fluid to vent through the turning plate 18 into the interior passageway 17 prior to the fluid reaching inlet 11 of the probe 10 due to the second pressure differential present across the turning plate 18. This boundary layer control substantially reduces the heated boundary layer air present in the fluid induced to flow into cavity 21. Thus, a substantially particulate-free core of unheated fluid flows around the rearward contour surface of the turning plate 18 at the upstream edge of the inlet 11 and into the primary cavity 21 where the fluid impinges upon the temperature sensing element 25 disposed therein. The temperature sensing element 25 generates an output signal on line 28 related to the total temperature of the flowing fluid to be used by air data processing components, not shown. The air data processing components further couple to remote air vehicle control system components to automatically adjust such components when sensed parameters change. The temperature sensing element 25 may comprise a thermocouple, thermistor, resistance thermal detector of platinum or other material, or other suitable temperature sensing element.

Figure 3:
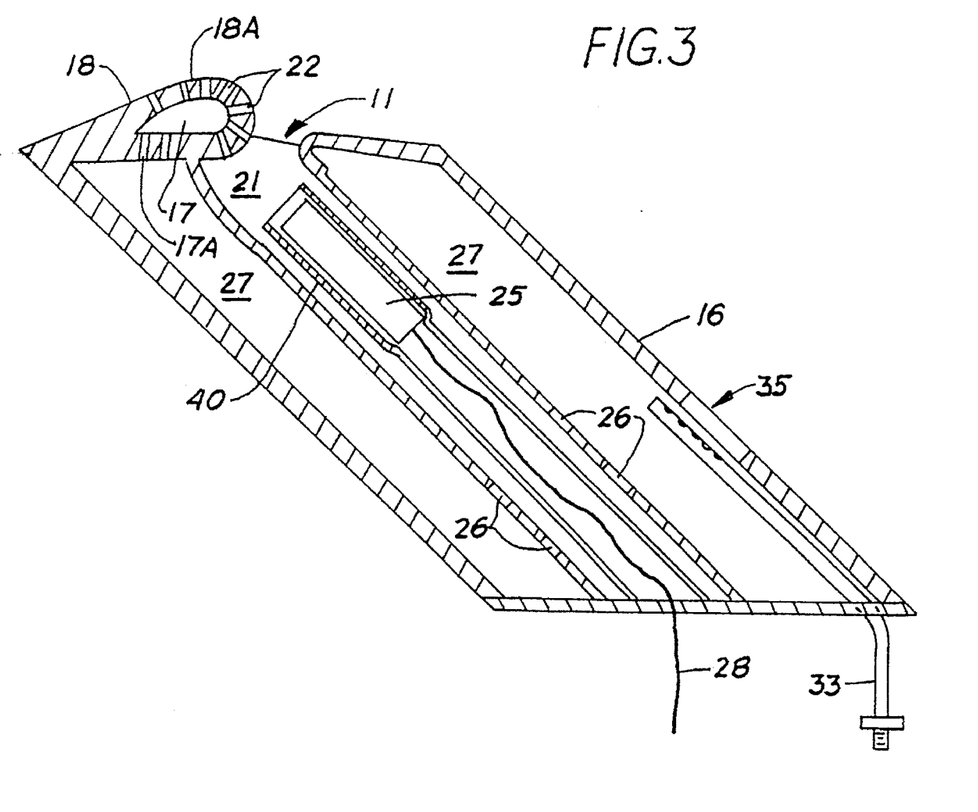
FIG. 3 is a partial sectional view of the first embodiment of the air data probe of the present invention taken along lines 3—3 of FIG. 2.

FIG. 3 shows that after impinging upon the temperature sensing element 25 the fluid passes through various apertures 26, disposed within the wall forming the primary cavity 21, and into the secondary cavity 27 formed in the interior of strut 16, to help reduce heat transfer between the probe heater elements and the temperature sensing element 25. When energized, the heating element 20 will impart a higher temperature to the secondary cavity 27. Thus, thermal communication occurs between the fluid flowing within secondary cavity 27 and the heating element 20 that helps to maintain probe 10 at an elevated temperature so that ice cannot collect upon the exposed exterior surfaces of the probe. Since the total temperature sensor of the present invention does not use a conventional scoop member adjacent the inlet to the temperature sensor cavity to collect fluid, the heating element can operate very efficiently and will therefore reduce the deicing heater error (DHE) for the present probe. The DHE results during energization of the heating element 20 which can thermally affect the fluid temperature registered by temperature sensing element 25. During low velocity movement of the fluid, the DHE can become large. For this reason, appropriate protective shielding 40 substantially surrounding the temperature sensing element 25 can be added to shield tile sensor 25 from thermal and radiation transients that induce such output signal errors.

More than one protective shielding member 40, having a common axis, can be placed around element 25 to provide even greater isolation to element 25. Furthermore, fluid flow through the probe 10 can be augmented by a suitable pneumatic ejector 33 coupled either to a dedicated exterior port 35, as shown, or to the exhaust ports 19. The ejector 33 acts as an aspirator. As fluid flows out the port 35 fluid is drawn through chamber 27. DHE and other thermal transfer effects occurring during zero or low velocity movement of the fluid stream 13 are reduced by injecting fluid through injector 33 to promote fluid flow through the interior off probe 10.

Figure 4:
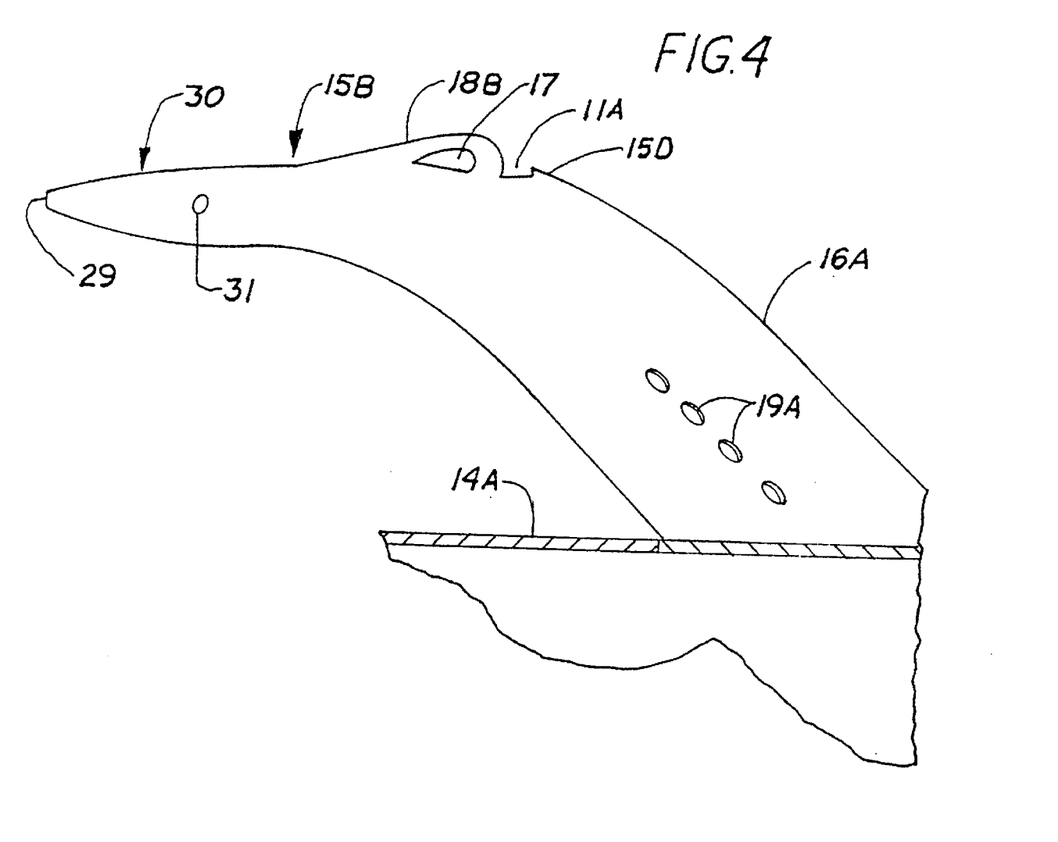
FIG. 4 is an elevational side view of a second embodiment of the air data probe of the present invention.
Figure 5:
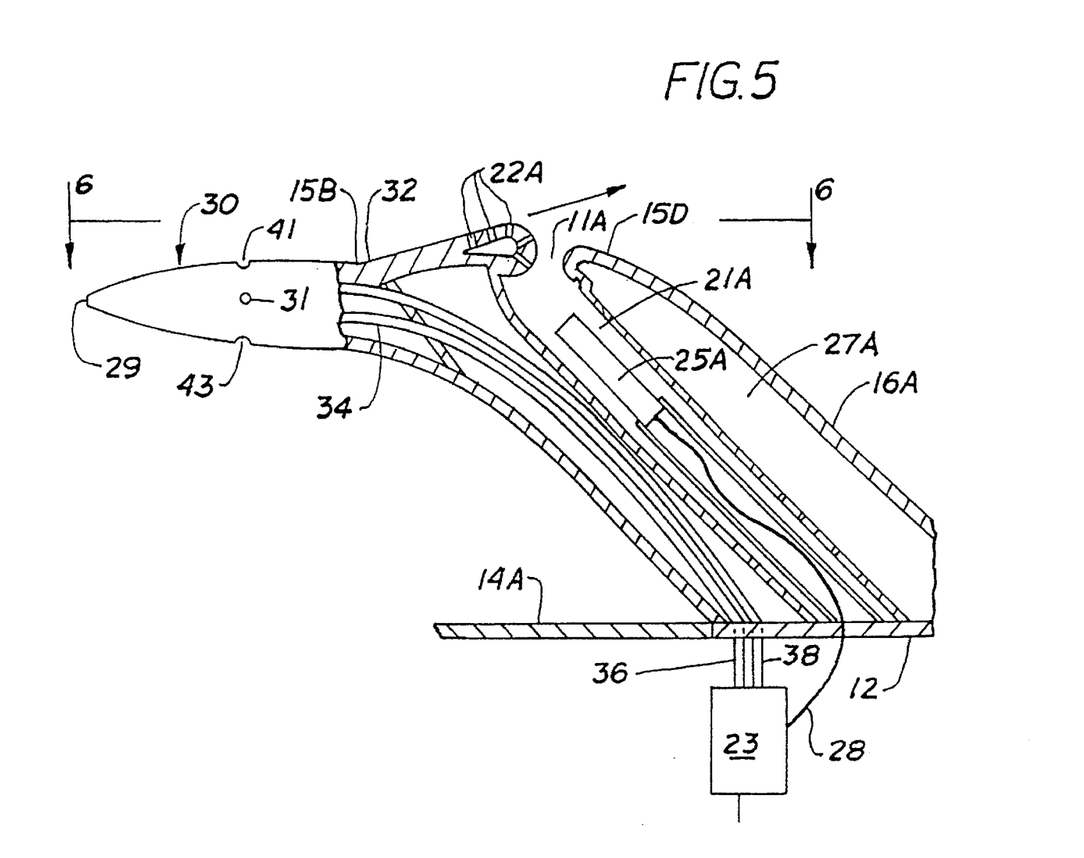
FIG. 5 is a side view of the second embodiment of the air data probe of the present invention with parts in section and parts broken away.
Figure 6:
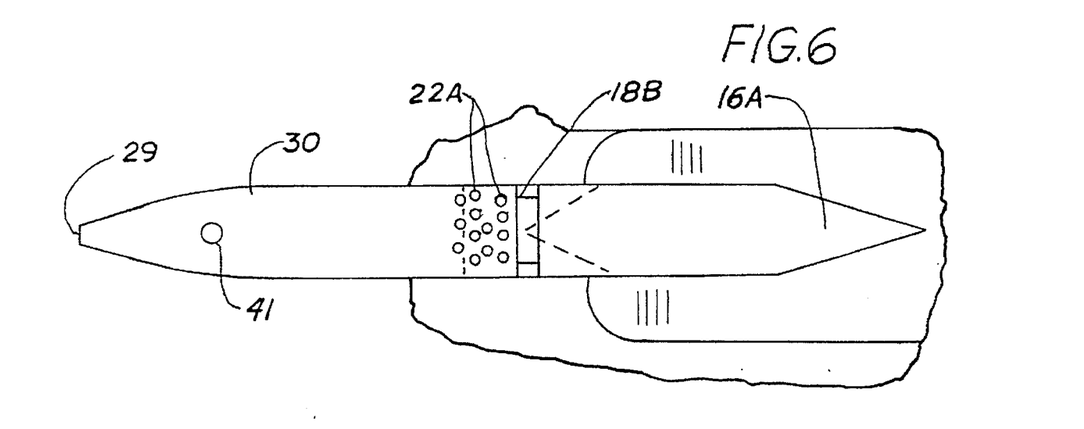
FIG. 6 is a plan view of the second embodiment of the air data probe of the present invention taken along lines 6—6 of FIG. 5.

FIGS. 4, 5 and 6 illustrate a second embodiment of the present invention wherein a conventional barrel-shaped pitot-static probe head member 30 mounts on a portion of the leading edge of a strut member 16A and projects forwardly from the strut 16A so that a smooth transition distal surface 15B forms at the junction with the probe head 30 and the strut 16A proximate turning plate 18B. The smooth transition surface 15B keeps the boundary layer from increasing in thickness beyond a manageable depth so that the turning plate 18B and associated apertures 22A effectively remove the boundary layer fluid, as earlier described, before the fluid turns and flows into inlet 11A and across a temperature sensor 25A in a cavity 21A. The fluid exhausts into cavity 27A and then out ports 19A.

Solder, braze or weld joints or other means providing adequate strength to the bond joining the probe head 30 to the strut 16A. A downstream ramp surface portion 15D of end surface 15B of the strut 16A tapers toward the proximal end of the strut and surface 14A immediately downstream of the inlet aperture 11A to provide an unobstructed path for debris and water droplets diverted from the turning plate 18B, as described with respect to the first embodiment of the present invention.

Aside from smoothly joining the distal end surface 15B to the probe head 30, the modifications required for the implementation of this embodiment are well known in the art. This includes providing suitable tubes or ducting 32, 34 and manifolding 36, 38 for pneumattically coupling at least one static pressure port 31 and/or one pitot pressure port 29 to further air data sensing instruments, as shown, data processing components 23 as desired. As known in the art, when probe 10 is mounted on the vertical centerplane of an air vehicle, two oppositely facing pressure ports 41 and 43 with their axes lying on a common plane parallel to the centerplane and to the base member 12 can be added to the probe 10 and the differential pressure at the two ports 41 and 43 provides an indication of the angle of attack. Local angle of sideslip can be measured with oppositely facing ports (such as 31) with their axes in a plane perpendicular to the centerplane and opening on the lateral surfaces of head 30. If active deicing is required the suitable heating element 20 can be augmented to include a heater portion to heat probe head 30, or separate heating elements may be used. This expedient allows active removal and avoidance of ice buildup for all-weather operation of the multifunctional air data probe of the present invention. The various pneumatic and electrical output signals are routed to the air data processing components 23, as shown in FIG. 5 preferably located proximate the base member 12. The air data processing components 23 couple, via line 28A, to further air vehicle control system components, not-shown.

Figure 7:
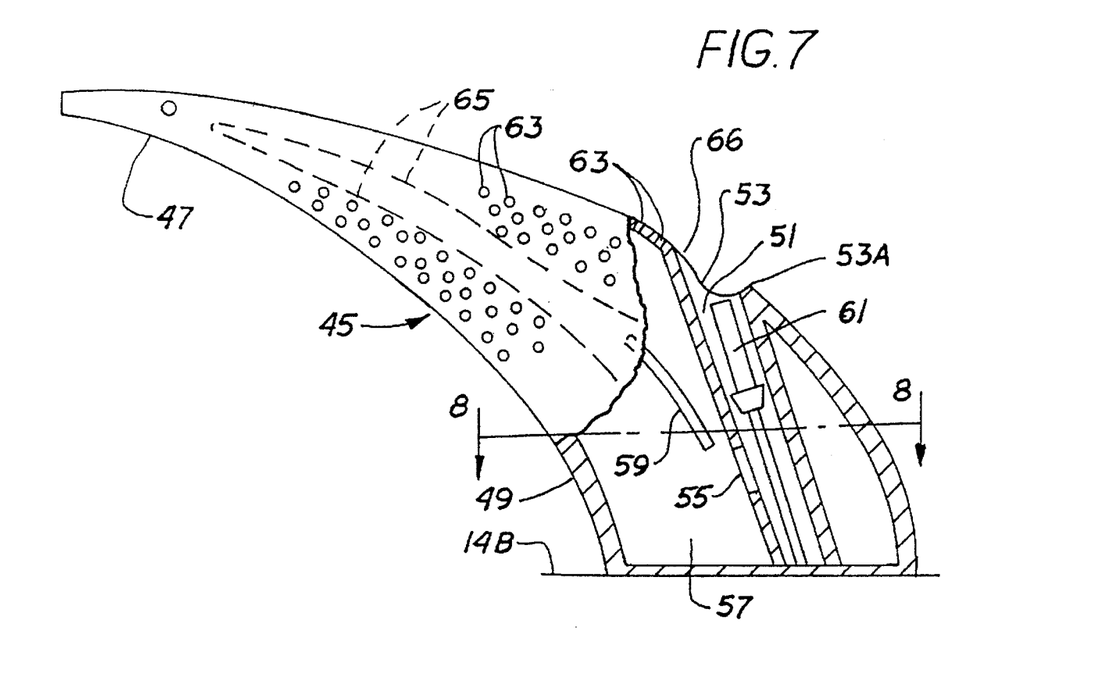
FIG. 7 is a side view of an air data probe made according to a modified form of the invention with parts broken away.
Figure 8:
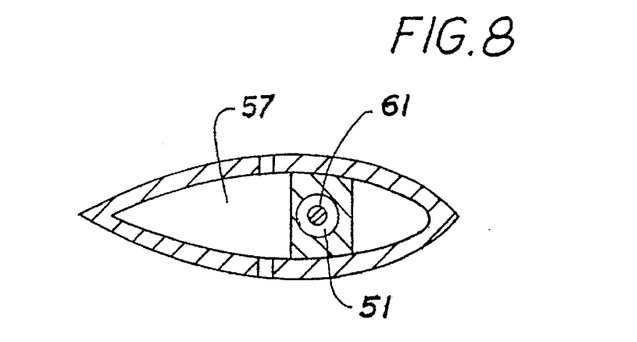
FIG. 8 is a sectional view taken on line 8—8 in FIG. 7.

A further modified embodiment of the invention is illustrated in FIGS. 7 and 8. In this form of the invention a probe 45 is curved from its base to an outer sensor end 47. A strut section 49 has an interior primary cavity 51 formed by an interior wall which opens through an inlet 53 at the rear side of the probe but which faces outwardly from the mounting surface. The primary cavity has an exhaust opening 5S that leads to a secondary cavity 57 that has exhaust slots or openings 59 formed thought the side wall of the probe. The slots 59 are in a location on the probe that has a reduced pressure with respect to the inlet 53 so that fluid flow is induced through the inlet and primary cavity across a temperature sensor 61.

Boundary layer control apertures separate the fluid entering the inlet 53 from the heated fluid by distributed withdrawal through perforations 63 that are provided through the strut wall is an array to insure that the boundary layer in the path of the fluid that enters the inlet is bled off through the perforations 63 and into the cavity 57, and then out through the exhaust slot 59. The inlet 53 is in part defined by a turning plate wall section 66 that extends laterally across the opening in the manner of turning plate 18. The plate 66 has perforations 63 as well to provide for bleeding boundary layer fluid off the turning plate wall section where fluid enters the inlet.

The probe is heated with heaters shown in dotted lines 65 so that if boundary layer control is not provided large errors in indicated temperatures can occur. The location of the perforations 63 is selected along the sides of the strut where flow is aligned with the inlet to the sensor cavity. The elimination of large bumps or irregularities keeps drag down and obtains accurate total temperature measurements while adequate boundary layer control is achieved. The rear lip 53A of the inlet 53 also is below the trajectory of particles flowing along the probe, and the surface downstream of the inlet comprises a ramp surface portion 53B that tapers toward the mounting surface shown at 14B. Preferably the strut and turning plate of the probe are made of metal for good thermal condition.

Although the present invention has been described with referenced to preferred embodiments, workers skilled in the art will recognize that changes may be made in form and detail without departing from the spirit and scope of the invention.

What is claimed is:

1. An air data probe for sensing a parameter of a fluid flow moving relative to the probe, wherein the probe has an inlet aperture open to the atmosphere comprising:

a strut having a leading edge, a distal portion and a base portion adapted for mounting to an air vehicle, and having the inlet aperture formed through the distal portion and facing generally transverse to the fluid flow, away from the base portion, the strut having an internal cavity fluidly coupled to the inlet aperture and an exhaust port fluidly coupled to the internal cavity;

temperature sensing means mounted in the internal cavity for sensing and providing an output related to the temperature of the fluid;

a perforated wall portion located upstream from the inlet aperture and having openings passing through the wall portion from a first surface on the distal portion and in contact with the fluid flow to an area maintained at a lower pressure than the fluid pressure present over the first surface to bleed off boundary layer fluid from the fluid flow prior to a portion of the fluid flow entering the inlet aperture; and a probe head member joined to the leading edge of the strut so that a continuous smooth transition surface leads from the probe head member to the perforated wall portion, and at least one pressure sensing port on the probe head member.

2. The air data probe of claim 1 wherein the probe head member includes the at least one pressure sensing port positioned relative to the fluid flow for sensing at least one of the parameters selected from the group consisting of total fluid pressure, static pressure of the fluid, and an angle of attack of the probe with respect to the fluid.

3. The air data probe of claim 2 further comprising pneumatic ejector means for inducing fluid flow in the internal cavity, sealingly coupled to the strut.

4. The air data probe of claim 2, further comprising heating means on the air data probe for providing an elevated temperature to the probe.

* * * * *